United States Patent
Corthesy-Malnoe et al.

(10) Patent No.: US 10,537,129 B2
(45) Date of Patent: Jan. 21, 2020

(54) PERSONALIZED SUPPLEMENTATION OF NUTRIENTS

(71) Applicant: NESTEC S.A., Vevey (CH)

(72) Inventors: Irene Corthesy-Malnoe, Epalinges (CH); Michael Jedwab, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/312,445

(22) PCT Filed: May 19, 2015

(86) PCT No.: PCT/EP2015/061019
§ 371 (c)(1),
(2) Date: Nov. 18, 2016

(87) PCT Pub. No.: WO2015/177166
PCT Pub. Date: Nov. 26, 2015

(65) Prior Publication Data
US 2017/0099867 A1    Apr. 13, 2017

(30) Foreign Application Priority Data
May 21, 2014    (EP) .................................... 14169301

(51) Int. Cl.
*A23L 33/10*    (2016.01)
*A23L 33/00*    (2016.01)

(52) U.S. Cl.
CPC ............... *A23L 33/30* (2016.08); *A23L 33/10* (2016.08); *A23V 2002/00* (2013.01)

(58) Field of Classification Search
None
See application file for complete search history.

(56) References Cited

U.S. PATENT DOCUMENTS

| | | |
|---|---|---|
| 6,197,329 B1 | 3/2001 | Hermelin et al. |
| 7,432,454 B1 | 10/2008 | Sze et al. |
| 2007/0050058 A1 | 3/2007 | Zuziak et al. |
| 2007/0260481 A1 | 11/2007 | Marshall |
| 2011/0053889 A1 | 3/2011 | Szabo |
| 2012/0214870 A1 | 8/2012 | Evans et al. |
| 2014/0105958 A1 | 4/2014 | Ntoya |

FOREIGN PATENT DOCUMENTS

| | | | | |
|---|---|---|---|---|
| DE | 4445772 | | 6/1995 | |
| WO | WO-03056493 A1 | * | 7/2003 | .............. A61J 3/002 |
| WO | 2014188079 | | 11/2014 | |

OTHER PUBLICATIONS

Harry Wallop "3D printing: Seven weird and wonderful uses" Apr. 15, 2014, printed from the internet at http://www.telegraph.co.uk/technology/news/10767017/3D-printing-Seven-weird-and-won . . . , 4 pages.

Alexander et al. "Relation of riboflavin nutriture n healthy elderly to intake of calcium and vitamin supplements: evidence against riboflavin supplementation1-3" The American Journal of Clinical Nutrition, Apr. 1984, vol. 39, pp. 540-546.

Pardeike et al. "Nanosuspension as advanced printing ink for accurate dosing of poorly soluble drugs in personalized medicines" International Journal of Pharmaceutics, 2011, vol. 420, pp. 93-100.

Pearse, Damien "Transforming mealtimes with 3D-printed food" Horizon—The EU Research and Innovation Magazine, Apr. 7, 2014, 3 pages.

European Patent Office Communication for corresponding patent application No. 15724250.4-1106 dated Jan. 18, 2018, 8 pages.

* cited by examiner

*Primary Examiner* — Jessica Worsham
(74) *Attorney, Agent, or Firm* — K&L Gates LLP

(57) ABSTRACT

The present invention provides nutritional compositions, preferably printed, comprising at least one nutrient for which a deficiency in nutrient intake and/or nutrient status in a subject was detected. Such nutritional composition is comprised by an administration unit, and the nutrient is present at an amount corresponding to the difference between the target value and actual value of the nutrient intake and/or status in the subject. The invention further provides medical uses of such printed nutritional compositions, e.g. in the treatment or prophylaxis of malnutrition. The invention also provides administration units comprising such the nutritional compositions, as well as a system and method for producing the same.

8 Claims, 1 Drawing Sheet

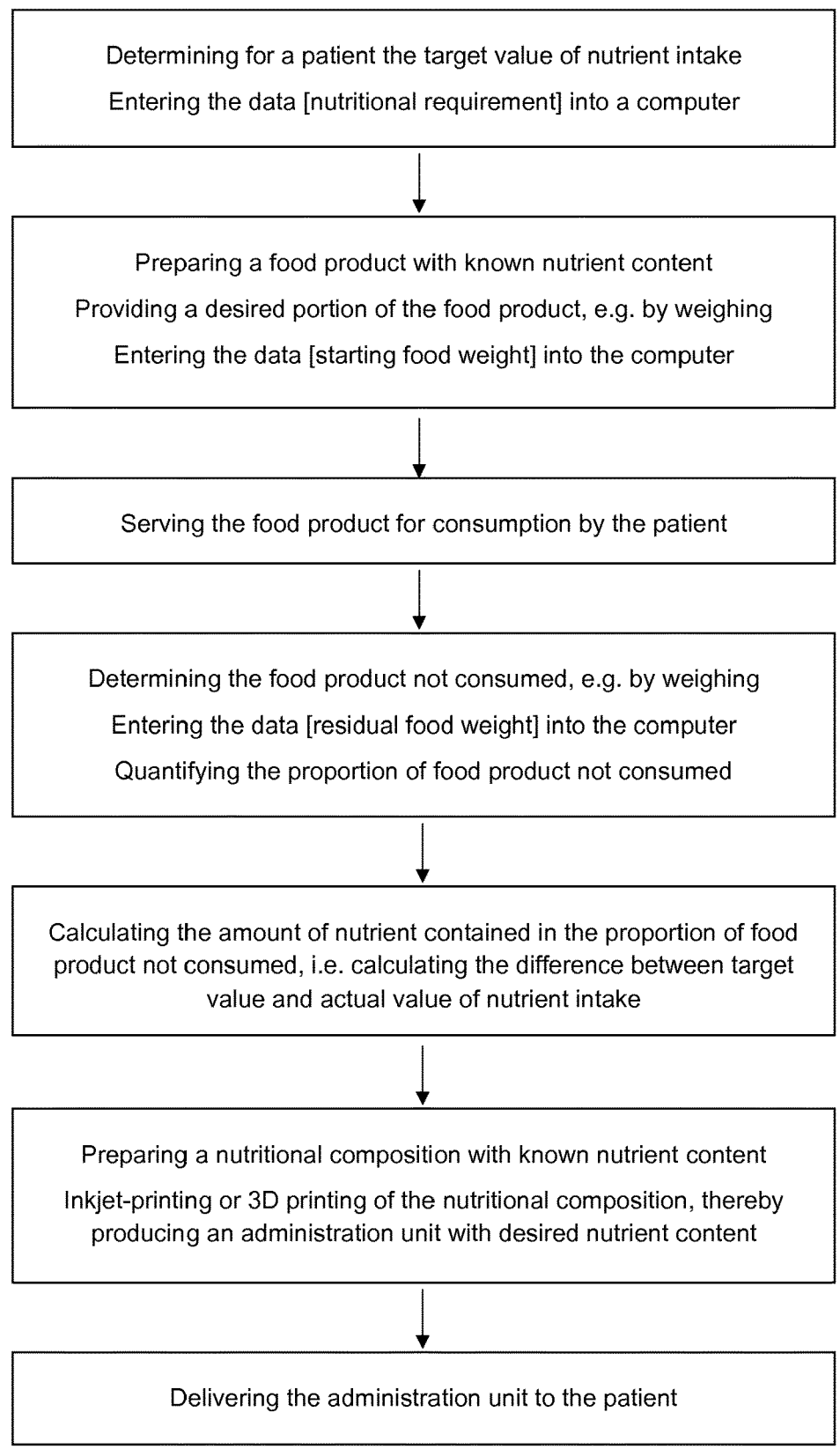

PERSONALIZED SUPPLEMENTATION OF NUTRIENTS

CROSS REFERENCE TO RELATED APPLICATIONS

The present application is a National Stage of International Application No. PCT/EP2015/061019, filed on May 19, 2015, which claims priority to European Patent Application No. 14169301.0, filed May 21, 2014, the entire contents of which are being incorporated herein by reference.

The present invention relates to the field of nutritional supplementation. In particular, the invention relates to medical uses of nutritional compositions, preferably printed, e.g. in the treatment or prophylaxis of nutrient deficiency and/or malnutrition. The invention further relates to such nutritional compositions, to administration units comprising such nutritional compositions, and to a system and method for producing the same.

BACKGROUND OF THE INVENTION

The nutritional requirement describes the need of an organism to ingest nutrients, e.g. water, energy, macronutrients (e.g. proteins, carbohydrates, fats) or micronutrients (e.g. minerals, organic acids, trace elements, vitamins), for maintaining vital and other biological functions. Nutritional requirements depend, at least partly, on the metabolic rate of an individual, vary between individuals and life stage, e.g. in man and women, children and adults, elderly people, and are altered under certain conditions, e.g. during pregnancy or breast-feeding, while smoking, or in case of suffering from certain diseases. For example, cancer, AIDS, rheumatoid arthritis, diabetes, or pancreatitis is known to alter the nutritional requirement of an individual. If, however, the nutritional requirement is not satisfied by nutrient intake over a longer period of time, a condition of nutrient deficiencies or malnutrition will develop which, in turn, may adversely affect the progress of disease further.

Amongst people who are at risk of malnutrition are institutional, nursing homes or hospital inpatients, e.g. undergoing surgery, because of changes in appetite and energy level or chewing and swallowing problems. For that and other reasons, food provided by the nursing homes, institutions or hospital kitchen is often only incompletely consumed.

In order to overcome the risk and development of nutrient deficiencies or malnutrition in patients, routine supplementation of nutrients that are regarded as critical, e.g. vitamins and trace elements may be considered. However, not only deficiencies in nutrient intake, but also excess of certain nutrients may be detrimental. While, for example, water-soluble vitamins are eliminated by the organism when overdosed, excessive intake of fat-soluble vitamins may lead to hypervitaminosis associated with nausea, vomiting and headache. Also jodide, a trace element, should be handled with care as an overdose of which may lead to thyroid dysfunction.

Accordingly, personalized supplementation of nutrients tailored to the specific requirements of an individual patient would be desirable.

In the context of nutrient supplementation, a potential value of edible printed products is predictable. One of the promises of this technology is supposed to create novel consumables with personalized nutritional content or patient-specific meals that are both nutritionally beneficial and soft enough to be chewed and swallowed easily. However, such nutrient-rich and soft printed foods are still under development.

It was thus an object of the present invention to provide methods and products useful in personalized nutritional supplementation.

SUMMARY OF THE INVENTION

The aim of the present invention is achieved by subject-matter specified in the independent claims. Particular embodiments of the invention are as specified in the dependent claims.

The object of the invention is solved by a nutritional composition, preferably printed comprising at least one nutrient for which a deficiency in nutrient status and/or nutrient intake by a subject was detected, wherein said nutrient is present at an amount or dose corresponding to the difference between the target value and the actual value of the nutrient status and/or nutrient intake by the subject.

The object of the invention is further solved by a nutritional composition comprising at least one nutrient for which a deficiency in the nutrient level of the subject was detected, the nutritional composition being comprised by an administration unit, wherein said nutrient is present in the administration unit at an amount or dose corresponding to the difference between the target value and the actual value of nutrient in the subject ("nutrient status").

In one embodiment, said nutrient is present at an amount falling within the range of 75-125%, or 80-120%, or 85-115%, or 90-110%, or 95-105%, or 100% of the value calculated for the difference between the target value and the actual value.

In one embodiment, the nutritional composition is a printed nutritional composition, such as an inkjet-printed or 3D printed nutritional composition, a 2D printed composition or is sprayed onto a food product or an otherwise edible product.

In one embodiment, the nutrient is a macro- or micronutrient selected from the group consisting of proteins, amino acids, carbohydrates, oligosaccharides, fats, lipids, fatty acids, nucleotides, vitamins, antioxidants, minerals, trace elements, and electrolytes.

In one embodiment, the target value and/or the actual value of nutrient is the target and/or the actual value of nutrient uptake.

In one embodiment, the target value and/or the actual value of nutrient intake is given as amount per meal or dish or food product.

In one embodiment, the difference between the target value and the actual value of nutrient intake is given as amount per administration unit or per quantity (e.g. weight or volume) of the nutritional composition.

In one embodiment, the target value and/or the actual value of nutrient is the level of nutrient in a sample from a subject.

In one embodiment, the nutritional composition, preferably printed nutritional composition is a pharmaceutical preparation.

In one embodiment, the nutritional composition preferably printed nutritional composition is based on at least one compound being soluble in oral fluid, e.g. saliva. Preferably, all compounds the printed nutritional composition is based on are soluble in oral fluid. Preferably, the compound is nutritionally or pharmaceutically acceptable.

The object of the present invention is further solved by an administration unit comprising the nutritional composition, preferably printed nutritional composition, wherein the administration unit is designed for oral administration, preferably for sublingual, perlingual or buccal administration.

In one embodiment, the administration unit is provided as a medicament or as a food product or as an otherwise edible product.

In one embodiment, the administration unit is provided as an administration form selected from the group consisting of a tablet, a foil, a film, and a wafer. Further oral administration forms such as a drop, a chewing gum, a capsule, or a caplet are also considered.

In a preferred embodiment, the administration unit is provided as an inkjet-printed or 3D printed tablet, foil, film, or wafer. Alternatively, any other design or shape of the administration unit is conceivable, particularly in case of a 3D printed administration unit In one embodiment, the administration unit and the printed nutritional composition are based on at least one compound being soluble in oral fluid, e.g. saliva. Preferably, all compounds the administration unit and the printed nutritional composition are based on are soluble in oral fluid. Preferably, the compound is nutritionally or pharmaceutically acceptable.

The object of the invention is further solved by the nutritional composition, preferably printed nutritional composition or by the administration unit, for medical use.

In one embodiment of the medical use, the nutritional composition, or the administration unit, is for use in the prophylaxis or treatment of nutrient deficiency and/or malnutrition in a subject.

In one embodiment of the medical use, the nutritional composition, preferably printed nutritional composition, or the administration unit, is for controlling or improving or optimizing the nutritional supply in a subject, preferably a malnourished subject or a subject being at risk of malnutrition.

In one embodiment of the medical use, the printed nutritional composition, or the administration unit, is for compensating a detected deficiency in nutrient status and/or nutrient intake by a subject, preferably a malnourished subject or a subject being at risk of malnutrition.

In one embodiment of the medical use, the subject is an inpatient at stay in hospital, nursing home or an institution.

In an alternative embodiment of the medical use, the subject is a semi-inpatient, an outpatient, a nursing home resident, a patient under home care, or a patient otherwise being in need of medical care.

In a preferred embodiment of the medical use, the subject or inpatient is a surgical patient, e.g. a patient who is preparing for or underwent bariatric surgery, and/or a patient undergoing would-healing, or a patient receiving anti-cancer therapy.

In another preferred embodiment of the medical use, the subject or inpatient is suffering from a condition selected from the group consisting of pre- or post-operative loss or lack of appetite, nausea, vomiting, anorexia, dysphagia, oesophageal stricture, impairment in chewing or swallowing, irritation or injury or inflammation or infection of the mouth or throat, a disease or malignancy of the mouth or throat, thyroid dysfunction, struma, disorientation, and dementia.

In a particularly preferred embodiment of the medical use, the subject or inpatient is suffering from post-operative nausea and vomiting (PONV), e.g. in consequence of anesthesia.

In another particularly preferred embodiment of the medical use, the subject or inpatient is suffering from nausea and vomiting (PONV) in consequence of chemotherapy or radiation therapy.

In yet another particularly preferred embodiment of the medical use, the subject or inpatient is suffering from post-operative impairment of chewing or swallowing, e.g. in consequence of an irritation or injury occurred under surgery or anesthesia.

The object of the invention is further solved by use of at least one nutrient in the preparation of the nutritional composition, preferably printed, or in the preparation of the administration unit, for medical use, preferably for use in the prophylaxis and treatment of malnutrition in a subject, or for controlling or improving or optimizing the nutritional supply in a subject, or for compensating a detected deficiency in nutrient intake and/or nutrient status in a subject.

The object of the present invention is further solved by a preferably computer-implemented method of medical treatment, preferably for the prophylaxis or treatment of malnutrition in a subject, or for controlling or improving or optimizing the nutritional supply in a subject, or for compensating a detected deficiency in nutrient intake and/or nutrient status in a subject, comprising the consecutive steps of:
(a) Determining for a subject a target value for at least one nutrient;
(b) Calculating the difference between the target value and actual value of nutrient;
(c) Preparing a nutritional composition;
(d) Producing a nutritional composition, preferably printed by using a printing technology;
Wherein the nutrient is present at an amount corresponding to the difference determined in step (b).

In one embodiment the method comprises the steps of:
(a) Determining for the subject the target value of intake of at least one nutrient;
(b) Providing the subject with a meal or food product comprising the nutrient at an amount or dose corresponding to the target value determined in step (a);
(c) Quantifying a proportion of the meal or food product not consumed by the subject;
(d) Calculating the difference between the target value and the actual value of nutrient intake by the subject;
(e) Producing a nutritional composition, preferably printed, the nutritional composition being comprised by an administration unit;
(f) Delivering the administration unit to the subject;
Wherein the nutrient is present, or wherein the nutrient is present in the administration unit, at an amount or dose corresponding to the difference determined in step (d).

In one embodiment the method comprises the steps of:
(a) determining for a subject the target value for at least one nutrient;
(b) measuring the level of at least one nutrients in a sample from the subject;
(c) calculating the difference between the target value and actual value of nutrient level in the sample;
(d) preparing a nutritional composition;
(e) producing the nutritional composition, preferably printed by using a printing technology;
Wherein the at least one nutrient is present at an amount corresponding to the difference determine in step (c).

The object of the invention is further solved by a computer-assisted process of producing the nutritional composition, preferably printed, or of producing the administration unit, comprising the consecutive steps of:

(a) Determining for a subject a target value for at least one nutrient;
(b) Calculating the difference between the target value and actual value of nutrient;
(c) Preparing a nutritional composition;
(d) Producing the nutritional composition, preferably printed by using a printing technology;

Wherein the nutrient is present at an amount corresponding to the difference determined in step (b).

In one embodiment the process comprises the steps of:
(a) Determining for the subject the target value of intake of at least one nutrient;
(b) Providing the subject with a meal or food product comprising the nutrient at an amount or dose corresponding to the target value determined in step (a);
(c) Quantifying a proportion of the meal or food product not consumed by the subject;
(d) Calculating the difference between the target value and the actual value of nutrient intake by the subject;
(e) Preparing a nutritional composition,
(f) Producing a nutritional composition, preferably printed by using a printing technology, preferably an inject-printing or $_3$D printing technology.

Wherein the nutrient is present, or wherein the nutrient is present in the administration unit, at an amount or dose corresponding to the difference determined in step (d).

In one embodiment the process comprises the steps of:
(a) determining for a subject the target value for at least one nutrient;
(b) measuring the level of at least one nutrients in a sample from the subject;
(c) calculating the difference between the target value and actual value of nutrient level in the sample;
(d) preparing a nutritional composition;
(e) producing the nutritional composition, preferably printed by using a printing technology;

Wherein the at least one nutrient is present at an amount corresponding to the difference determine in step (c).

The object of the invention is further solved by the nutritional composition, preferably printed, or the administration unit, obtained by the above methods of producing the same.

The object of the invention is further solved by a system for producing the printed nutritional composition, or for producing the administration unit, the system comprising:
(a) Means for quantifying a meal or a food product, preferably a weighing device;
(b) Means for quantifying a proportion of the meal or food product not consumed by a subject;
(c) Means for calculating the difference between the target value and the actual value of nutrient intake by the subject.
(d) Means for preparing a nutritional composition;
(e) Means for producing the nutritional composition, preferably printed.

In one embodiment, the means for producing the printed nutritional composition is for producing an inkjet, 2D or 3D printed nutritional compositin.

In another embodiment, the means for producing the nutritional composition is for spraying onto a food product or an otherwise edible product. In one embodiment, the system further comprises means for determining for the subject the target value of intake of at least one nutrient and/or means for delivering the printed nutritional composition or the administration unit to the subject.

The object of the invention is further solved by a system for producing the printed nutritional composition, or for producing the administration unit, the system comprising:
(a) means for determining a level of one or more nutrients in a sample from a subject;
(b) means for calculating the difference between the target nutrient value and the actual nutrient value of the subject;
(c) means for preparing a nutritional composition;
(d) means for producing the nutritional composition, preferably printed.

In one embodiment, the means for producing the printed nutritional composition is for producing an inkjet, 2D or 3D printed nutritional composition.

In another embodiment, the means for producing the nutritional composition is for producing another format, e.g. wafer, etc. The object of invention is further solved by use of a printing technology, preferably an inkjet-printing or 3D printing technology, for producing the printed nutritional composition, or for producing the administration unit.

As those of skill in the art will understand, further embodiments may result from other combinations of features specified above.

DETAILED DESCRIPTION OF THE INVENTION

The present invention provides a nutritional composition, preferably printed, with tailored nutrient content, i.e. the content of one or more nutrients is adapted to the specific requirements of an individual patient. In this sense, the invention is regarded as contributing to the increasingly promising field of personalized medicine.

Taking advantage of printing technologies, in particular such as inkjet- or 3D printing, the present invention allows for individually preparing nutritional compositions on demand and "in situ", e.g. in a hospital. In this manner, the delay between detecting a deficiency in nutrient intake and administering a nutritional composition for compensating the deficiency can be kept short.

As the present invention helps optimize the nutrient supply of a patient, adverse effects on the patient's condition and a progress of disease, possibly entailing the need of parenteral feeding, can be counteracted or prevented. This is beneficial not only for the patient him- or herself, but is of advantage also for economical reasons.

The term "target value of nutrient intake", as used in the claims, is linked to the nutritional requirement of an individual. The nutritional requirement may be given as the amount of nutrient [e.g. in g, mg, µg, ng, pg, or mol] per time interval, preferably per 24 hours or one day. Further time intervals (e.g. minute, hour, week, month) are also considered. If nutrient intake occurs only once a day, the "target value of nutrient intake" may be given as the amount of nutrient per day.

Mostly, however, nutrient intake will occur more often than once a day, so that the daily nutritional requirement could be satisfied by more than one meal. In this case, the daily nutritional requirement would be split up. Then, the "target value of nutrient intake" may be given as the amount of nutrient per meal.

For example, if the nutritional requirement of jodine is 180-200 µg per day (i.e. the recommended daily dosage for a healthy adult) the required amount of jodine (usually provided in the form of a jodide salt) may be administered to the patient with just one daily meal. In another example, 45-50 µg jodine may administered with each of four daily meals. In yet another example, 90-100 μg jodine may be administered with one principal meal, and 45-50 μg may be administered with two further meals each.

As the nutritional requirement may be time-dependent, i.e. may change with time, the "target value of nutrient intake" per meal may change. When considering time-dependency, a starting point may be fixed, e.g. the day of surgery is set "zero".

The "difference between the target value and actual value of nutrient intake" corresponds to the amount of nutrient contained in the proportion of food not consumed. For illustration purposes only, the difference may be determined as follows:
 (a) Determining for a patient the target value of nutrient intake, e.g. 10 mg of nutrient A per meal;
 (b) Preparing a food containing to mg of nutrient A;
 (c) Weighing the food;
 (d) Serving the food for consumption by the patient;
 (e) Determining whether or not the food is completely consumed;
 (f) If not, weighing the food not consumed;
 (g) Quantifying the proportion of food not consumed, e.g. 40%;
 (h) Based on the proportion of food not consumed, deriving the amount of nutrient not consumed, i.e. 0.4×10 mg of nutrient A=4 mg In the above example, the "actual value of nutrient intake" is 6 mg (the proportion of consumed food is 60%). Consequently, the "difference between the target value and actual value of nutrient intake" is 10 mg-6 mg=4 mg, i.e. the amount of nutrient determined in step (h) above. Thus, the nutrient is present in the administration unit at an amount of 4 mg.

If desired, though not absolutely necessary, the "actual value of nutrient intake" may be determined.

The term "target nutrient levels" in a sample may refer to nutrient levels which are indicative of appropriate levels for the particular pathology of the patient being treated, which may vary over time. The target values may be in the form of specific values or a range of values indicative of healthy subjects. By comparing the target values with actual values of nutrient levels, it can be determined whether the subject requires supplementation with particular nutrients.

The term "nutrient status" or "actual nutrient levels in a sample" refer to the level of at least one nutrient which is measured in a sample from the subject.

Methods for determining the level of a nutrient are well-known in the art. For example, the measurement may be performed using any type of analytical device or system, for instance a spectroscopy device, for example a light spectrometry system, a mass spectrometry system, high-resolution NMR spectroscopy system, etc. Various suitable methods are described in, for example, Rezzi et al., Trends in Analytical Chemistry 52 (2013):112-119.

In one embodiment, the measurement may be performed using a biosensor.

In one embodiment, the measurement may be performed using an NMR spectrometer. NMR spectroscopy offers the unique prospect to profile holistically hundreds of nutrients and/or their metabolites with no a priori selection in an analytically robust manner and with no or very limited sample preparation (see e.g. F. P. Martin et al., Magn. Reson. Chem. 49 (2011) S47-S54; J. C. Lindon et al., Annu. Rep. NMR Spec. 38 (1999) 1-88). In some embodiments, parallel analysis of urine and blood plasma nutrient profiles may be performed. Intact tissue samples can also be profiled by high-resolution magic angle spinning NMR spectroscopy using minimal sample preparation. Proton NMR spectroscopy may be used for sensitivity reasons, while the carbon-13 nucleus can also be measured, often for confirming molecular identity or even for structure elucidation purposes using multidimensional techniques.

In another embodiment, the measurement may be performed using a mass spectrometer. MS may be employed for global or targeted profiling, e.g. as described in I. D. Wilson et al., J. Chromatogr. B Analyt. Technol. Biomed. Life Sci. 817 (2005) 67-76 and M. R. Wenk, Nat. Rev. Drug Discov. 4 (2005), 594-610. MS can be coupled to gas chromatography (GC) or liquid chromatography (LC), including at the nL scale, to enable highly sensitive metabolite analysis using a range of ionization techniques, but requiring preliminary sample preparation. A broad panel of methods is available for measuring classes of various nutrients and their metabolites, such as amino acids, fatty acids, organic acids, vitamins and phytonutrients. Thanks to recent technological advances, MS analytical performance in terms of sensitivity, mass accuracy, scan rate and resolution improved to the point of allowing profiling of biological samples even in the absence of a preliminary chromatographic step, such as in lipid analysis (i.e. lipidomics) (see K. Schuhmann et al., J. Mass Spectrom. 47 (2012) 96-104.

Thus in particular embodiments, the mass spectrometer may use an ionization method selected from electron impact (EI), chemical ionization (CI), field ionization (FDI), electrospray ionization (ESI), laser desorption ionization (LDI), matrix assisted laser desorption ionization (MALDI) and surface enhanced laser desorption ionization (SELDI). In further embodiments, the mass spectrometry detection method is selected from quadrapole mass spectroscopy (QMS), fourier transform mass spectrometry (FT-MS) and time-of-flight mass spectrometry (TOF-MS).

In general the term "sample" as used herein refers to any body fluid or other tissue sample types, e.g. blood, plasma, serum, sputum, saliva, sweat (perspiration) or urine. Techniques for obtaining such samples from subjects are well known. The term also includes samples of other tissues or fluids obtained by contact with body tissues, e.g. exhaled breath or contact with the skin.

The present process is typically practiced outside of the human or animal body, e.g. on a body fluid sample that was previously obtained from the subject to be tested. Preferably the sample is derived from blood, i.e. the sample comprises whole blood or a blood fraction such as blood plasma or serum.

Techniques for collecting blood samples and separating blood fractions are well known in the art. For instance, vena blood samples can be collected from patients using a needle and deposited into plastic tubes. The collection tubes may, for example, contain spray-coated silica and a polymer gel for serum separation. Serum can be separated by centrifugation at 1300 RCF for 10 min at room temperature and stored in small plastic tubes at −80° C.

The term "nutrient" refers to compounds having a beneficial effect on the body e.g. to provide energy, growth or health. The term includes organic and inorganic compounds.

As used herein the term nutrient may include, for example, macronutrients, micronutrients, essential nutrients and phytonutrients.

These terms are not necessarily mutually exclusive. For example, certain nutrients may be defined as either a macronutrient or a micronutrient depending on the particular classification system or list.

The expression "at least one nutrient" or "one or more nutrients" means, for example, one, two, three, four, five, ten, 20 or more nutrients.

The term "determining a level of one or more nutrients" includes determining metabolites and/or biomarkers of individual nutrients. Thus in some embodiments, a level of e.g. a metabolite or other indicator of one or more of the above nutrients is measured. Metabolites as indicators of nutritional status are described, for example, in Rezzi et al., Trends in Analytical Chemistry 52 (2013):112-119.

The term "macronutrient" is well known in the art and is used herein according to it standard meaning to refer to a nutrient which is required in large amounts for the normal growth and development of an organism.

Macronutrients include, but are not limited to, carbohydrates, fats, proteins, amino acids and water. Certain minerals may also be classified as macronutrients, such as calcium, chloride, or sodium.

The term "micronutrient" refers to compounds having a beneficial effect on the body, e.g. to provide energy, growth or health, but which are required in only minor or trace amounts. The term includes both organic and inorganic compounds, e.g. individual amino acids, nucleotides and fatty acids; vitamins, antioxidants, minerals, trace elements, e.g. iodine, and electrolytes, e.g. sodium chloride, and salts thereof.

An illustrative list of vitamins includes, vitamins A, D, E, K, B1, B2, B6, B12, and C, retinol, retinyl acetate, retinyl palmitate, beta-carotene, cholecalcipherol, ergocalcipherol, D-alpha-tocopherol, DL-alpha-tocopherol, D-alpha-tocopheryl acetate, D-alpha-tocopheryl acid succinate, phyllochinone, thiamine hydrochloride, thiamine mononitrate, riboflavin, sodium riboflavin-5'-phospate, nicotinic acid, nicotinamide, calcium-D-pantothenate, sodium-d-pantothenate, dexpanthenol, pyridoxine hydrochloride, pyridoxine-5'-phosphate, pyridoxine dipalmitate, pteroyl-monoglutamic acid, cyancobalamin, hydroxocobalamin, D-biotin, L-ascorbic acid, sodium-L- ascorbate, calcium-L-ascorbate, potassium-L-ascorbate, and L-ascorbyl-6-palmitate.

An illustrative list of minerals includes, calcium, magnesium, iron, copper, iodide, zinc, manganese, sodium, potassium, selenium, chromium, molybdenum, fluoride, carbonate and chloride.

An illustrative list of organic acids includes, acetic acid, citric acid, lactic acid, malic acid, choline and taurine.

An illustrative list of amino acids includes, L-alanine, L-arginine, L-cysteine, L-histidine, L-glutamine acid, L-glutamine, L-isoleucine, L-leucine, L-lysine, L-methionine, L-ornithine, phenylalanine, L-threonine, L-tryptophan, L-tyrosine, and L-valine.

An illustrative list of fatty acids includes C4:0, C6:0, C8:0, C10:0, C11:0, C12:0, C13:0, C14:0, C15:0, C16:0, C17:0, C18:0, C20:0, C21:0, C22:0, C24:0, C14:1 n-5, C15:1 n-5, C16:1 n-7, C17:1 n-7, C18:1 n-9 trans, C18:1 n-9 cis, C20:1 n-9, C22:1 n-9, C24:1 n-9, C18:2 n-6 trans, C18:2 n-6 cis, C18:3 n-6, C18:3 n-3, C20:2 n-6, C20:3 n-6, C20:3 n-3, C20:4 n-6, C22:2 n-6, C20:5 n-3 and C22:6 n-3 fatty acids. In the nomenclature CX:Y, X refers to the total number of carbon atoms in the fatty acid and Y defines the total number of double bonds in the fatty acid.

The term "phytonutrient" refers to a bioactive plant-derived compound associated with positive health effects.

An illustrative, non-exhaustive list of phytonutrients includes: terpenoids (isoprenoids) such as carotenoids, triterpenoid, monoterpenes and steroids; phenolic compounds, for example natural monophenols, polyphenols (e.g. flavonoids, isoflavonoid, flavonolignan, lignans, stilbenoids, curcuminoids, stilbenoid and hydrolysable tannin); aromatic acids (e.g. phenolic acids and hydroxycinnamic acids); capsaicin; phenylethanoids; alkylresorcinols; glucosinolates; betalains and chlorophylls.

The term "essential nutrient" is used herein to refer to a nutrient which the subject cannot synthesize endogenously, or cannot synthesize at the level required for good health. For example an essential nutrient may be a nutrient which must be obtained from the subject's diet.

An illustrative, non-exhaustive list of essential nutrients includes essential fatty acids, essential amino acids, essential vitamins and essential dietary minerals.

Essential amino acids for humans include phenylalanine, valine, threonine, tryptophan, methionine, leucine, isoleucine, lysine and histidine.

Essential fatty acids for humans include alpha-linolenic acid and linoleic acid.

The term "administration unit" refers to a unit, optionally consisting of several sub-units, by which the dose of nutrient, i.e. the amount corresponding to the difference between the target value and actual value of nutrient intake, is delivered to the subject.

It is preferred that the administration unit comprising the nutritional composition does not need to be swallowed or ejected from the mouth. Thus, the administration unit shall disintegrate quickly upon placement in the subject's mouth, thereby releasing the nutrient into oral fluid, so that the nutrient is swallowed with oral fluid and absorbed in the digestive tract (enteral absorption). For that purpose, the administration unit and the nutritional composition is based on water-soluble material, in particular on material soluble in oral fluid such as saliva. In addition or alternatively, the nutrient is at least partly absorbed by the oral mucosa (parenteral absorption).

A "foil" or a "film" means a thin, flexible leaf or sheet of a layer of a material. Optionally, more than one layer of the same or different material may provided (multi-layered foil or film)

The "inkjet-printing technology" is a type of computer printing that involves propelling droplets of a printing solution or ink onto a support. In case of an "inkjet-printed tablet, foil, film, or wafer", the nutritional composition is inkjet-printed onto an appropriate support. Preferably, the support is soluble in oral fluid, e.g. saliva.

The "3D printing technology" involves a process of making a three-dimensional solid object of virtually any shape from a digital model. Building up the solid object is realized by means of an additive process in which successive layers of material are laid down in the same or different shapes. In case of a "3D printed tablet, foil, film, or wafer", the nutritional composition is included in the tablet, foil, film, or wafer. This may be achieved by mixing the nutritional composition with compounds for forming a matrix (of the administration form), while the resulting mixture must be suitable for 3D printing. Alternating layers with and without nutrients are also considered.

In one embodiment, the nutritional composition may be sprayed onto a food product or an otherwise edible product.

A "patient" refers to an individual requiring a physician's or nursing care. Alternative to patients staying in hospital such care can be provided in a nursing home or as home care. The term comprises infants, children, adults and elderly people. The patient may be a nursing home resident and/or a bed-ridden person. The term may also comprise animals, in particular companion animals such as a cat or dog.

The condition of "thyroid dysfunction" or "struma" often leads to the need of surgery resulting in injury and later wound-healing in the mouth and throat region. Thus, a patient who recently underwent surgery due to these conditions is particularly considered to benefit from the present invention. Moreover, such patient may require supplementation with jodide (see above).

It is preferred that the step of "determining for a subject the target value of intake of at least one nutrient" is carried out ex vivo, e.g. calculated on the basis of information from literature, data bases or similar sources. However, investigations on the human or animal body, such as measurements of a subject's metabolic rate, may also be considered.

Further advantages and features of the present invention will be apparent to those of skill in the art from the following examples along with attached FIG. 1

BRIEF DESCRIPTION OF THE FIGURE

FIG. 1 is a flow chart illustrating one way of carrying out the invention.

EXAMPLES

Example 1

Determination of Nutritional Requirement

The nutritional requirement of a patient is determined under consideration of selected parameters such as the particular reason for stationary treatment (e.g. surgery or treatment of a disease or medical condition), any (further) diseases, the patient's general physical condition, sex, age, or body mass index (BMI). Basically, every parameter known to affect the nutritional requirement, e.g. by altering the metabolic rate of an individual, may be considered. The nutritional requirement may be determined shortly after the patient's admission to the hospital or nursing home, and its determination may be repeated, if appropriate, e.g. for adaptation to altered circumstances.

Based on the nutritional requirement, the target value of nutrient intake is calculated.

Preferably, determination of the nutritional requirement and calculation of the target value of nutrient intake is executed with the assistance of a data processing system, e.g. computer.

Example 2

Determination of Deficiency in Nutrient Supply

The patient is provided with a meal, e.g. a complete dish or any food product, meeting the target value of nutrient intake. The food may be served through an automatic system or a person. Preferably, the food is hospital-prepared or nursing home-prepared. Prior to serving to the patient, the food is weighted, either automatically or manually. If the patient does not finishing off the food provided, any unconsumed food is quantified by weighing [g or kg], either automatically or manually. From the proportion of unconsumed food relative to the food's starting weight, the amount of unconsumed nutrient, i.e. the difference between target value and actual value of nutrient intake, is calculated.

Preferably, any calculation and quantification steps are executed with the assistance of a data processing system, e.g. a computer.

Example 3

Manufacture of an Inkjet-printed Foil or Film

A nutritional composition in the form of a printing solution having a predetermined concentration (amount/volume, e.g. g/l, mg/ml, mol/l, or mmol/l) of a nutrient is prepared. Then, a predetermined volume of the nutritional composition, and thus the desired amount of nutrient, is printed on a foil or a film serving as a support. The process of printing can be carried out in a single printing step or, alternatively, by repeating the step of printing several times.

Example 4

Manufacture of a 3D Printed Administration Form

A 3D printing solution containing a predetermined concentration of nutrient is prepared. Then, a three-dimensional object is build up by successively layering predetermined volumes of the printing solution, thereby creating an administration form containing the desired amount of nutrient.

The invention claimed is:

1. A process of producing an edible administration unit comprising at least one nutrient, the process comprising:
   investigating a subject's parameter selected from the group consisting of a particular reason for surgery or treatment of a disease, diseases, general physical condition, sex, age, body mass index, and combinations thereof;
   wherein the subject is selected from the group consisting of a patient who is preparing for or underwent bariatric surgery, a patient undergoing wound-healing, and a patient receiving anti-cancer therapy;
   measuring the subject's metabolic rate;
   calculating a target nutrient intake value for the at least one nutrient for the subject based on the subject's metabolic rate and the subject's parameter;
   providing the subject with a meal or food product comprising the at least one nutrient at an amount corresponding to the target nutrient intake value;
   quantifying a proportion of the meal or food product not consumed by the subject;
   determining for the subject an actual nutrient intake value of the at least one nutrient;
   calculating a difference between the target nutrient intake value and the actual nutrient intake value of the at least one nutrient based on an uptake of the meal or food product by the subject, the actual nutrient intake value corresponding to a deficiency in intake and/or status of the at least one nutrient; and
   producing the edible administration unit by using a process selected from the group consisting of inkjet printing and 3D-printing a nutritional composition onto a food product to tailor the amount of the at least one nutrient,
   wherein the at least one nutrient is present in the edible administration unit in an amount corresponding to the difference between the target nutrient intake value and the actual nutrient intake value of the at least one nutrient based on the uptake of the meal or food product by the subject.

2. A process of producing an edible administration unit comprising at least one nutrient, the process comprising:
   investigating a subject's parameter selected from the group consisting of a particular reason for surgery or treatment of a disease, diseases, general physical condition, sex, age, body mass index, and combinations thereof;

wherein the subject is selected from the group consisting of a patient who is preparing for or underwent bariatric surgery, a patient undergoing wound-healing, and a patient receiving anti-cancer therapy;

measuring the subject's metabolic rate;

calculating a target nutrient intake value for the at least one nutrient for the subject based on the subject's metabolic rate and the subject's parameter;

determining for the subject an actual nutrient value of the at least one nutrient by measuring a level of the at least one nutrient in a sample taken from the subject, the actual nutrient value being a nutrient level in the sample taken from the subject;

calculating a difference between the target nutrient value and the actual nutrient value of the at least one nutrient based on the nutrient level in the sample, the actual nutrient value corresponding to a deficiency in intake and/or status of the at least one nutrient; and producing the edible administration unit by using a process selected from the group consisting of inkjet printing and 3D-printing a nutritional composition onto a food product to tailor the amount of the at least one nutrient, wherein the at least one nutrient is present in the edible administration unit in an amount corresponding to the difference between the target nutrient value and the actual nutrient value of the at least one nutrient based on the nutrient level in the sample.

3. The process according to claim 2, wherein the actual nutrient value of the nutrient level in the sample is determined by a device selected from the group consisting of light spectrometry, mass spectrometry, and NMR spectrometry.

4. The process according to claim 1, performed by a system comprising:
   means for quantifying the meal or food product;
   means for quantifying a proportion of the meal or food product not consumed by the subject;
   means for calculating the difference between the target nutrient intake value and the actual nutrient intake value by the subject; and
   means for producing the edible administration unit.

5. The process according to claim 1, wherein the subject is malnourished or at risk of malnutrition.

6. The process according to claim 2, wherein the subject is malnourished or at risk of malnutrition.

7. The process according to claim 1, wherein the subject is selected from the group consisting of an inpatient at a hospital, a semi-inpatient, an outpatient, a nursing home resident, a patient under home care, or a patient otherwise in need of medical care.

8. The process according to claim 2, wherein the subject is selected from the group consisting of an inpatient at a hospital, a semi-inpatient, an outpatient, a nursing home resident, a patient under home care, or a patient otherwise in need of medical care.

* * * * *